United States Patent
Bower, III et al.

(10) Patent No.: US 12,210,625 B2
(45) Date of Patent: Jan. 28, 2025

(54) SYSTEM TO ENABLE SECURE BOOT FROM EXPIRED CERTIFICATE VIA DIGITAL SIGNATURE PROXY

(71) Applicant: Lenovo Enterprise Solutions (Singapore) Pte. Ltd., New Tech Park (SG)

(72) Inventors: Fred Allison Bower, III, Durham, NC (US); Hussein Jammal, Bucharest (RO)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 117 days.

(21) Appl. No.: 18/129,525

(22) Filed: Mar. 31, 2023

(65) Prior Publication Data

US 2024/0330468 A1 Oct. 3, 2024

(51) Int. Cl.
*G06F 9/00* (2018.01)
*G06F 15/177* (2006.01)
*G06F 21/57* (2013.01)
*H04L 9/32* (2006.01)

(52) U.S. Cl.
CPC .......... *G06F 21/575* (2013.01); *G06F 21/572* (2013.01); *H04L 9/3268* (2013.01)

(58) Field of Classification Search
CPC ..... G06F 21/572; G06F 21/575; H04L 9/3268
See application file for complete search history.

(56) References Cited

U.S. PATENT DOCUMENTS

| | | | |
|---|---|---|---|
| 2014/0331037 A1* | 11/2014 | Lewis | G06F 9/4401 713/2 |
| 2016/0232356 A1* | 8/2016 | Barkelew | G06F 9/4401 |
| 2017/0249135 A1* | 8/2017 | Gandhi | H04L 63/0492 |
| 2020/0257518 A1* | 8/2020 | Liedtke | G06F 8/65 |
| 2020/0356672 A1* | 11/2020 | Paulraj | H04L 63/0823 |
| 2022/0222096 A1* | 7/2022 | Archie | G06F 8/63 |
| 2022/0327243 A1* | 10/2022 | Singh | G06F 9/4411 |

* cited by examiner

Primary Examiner — Mohammed H Rehman
(74) Attorney, Agent, or Firm — Kunzler Bean & Adamson; Bruce R. Needham

(57) ABSTRACT

A method for allowing a firmware update when a digital certificate for a firmware update image is expired includes initiating a firmware update of a computing device and determining, using a secure boot process, that a firmware update image has an expired digital certificate. The firmware update image is stored in nonvolatile memory accessible to a service processor and to a host processor of the computing device. The method includes determining that the firmware update image and an image of firmware with code of the secure boot process were digitally signed by a same entity and overriding the secure boot process to allow execution of the firmware update image in response to determining that the firmware update image and the image of the firmware with code of the secure boot process were digitally signed by a same entity.

20 Claims, 6 Drawing Sheets

SYSTEM TO ENABLE SECURE BOOT FROM EXPIRED CERTIFICATE VIA DIGITAL SIGNATURE PROXY

FIELD

The subject matter disclosed herein relates to firmware updates and more particularly relates to enabling firmware updates when a digital certificate has expired for a firmware update image.

BACKGROUND

In typical server systems, it is common to have a service processor subsystem with auxiliary storage connected to it. To facilitate system maintenance, a bootable firmware update image may be installed to enable system updating. This is typically digitally signed to certify that the maintenance provided does not tamper with the system in an unauthorized fashion. In recent generations, systems now support secure boot, which requires a valid certificate be present for any image, including the embedded firmware updating utility. Certificates have expirations. Therefore, the embedded firmware updating image may not be bootable if it has an expired certificate while secure boot is active. Deactivating secure boot will typically cause systems using it to enter a security locked state, from which recovery is complicated.

BRIEF SUMMARY

A method for allowing a firmware update when a digital certificate for a firmware update image is expired is disclosed. The method includes initiating a firmware update of a computing device and determining, using a secure boot process, that a firmware update image has an expired digital certificate. The firmware update image is stored in nonvolatile memory accessible to a service processor and to a host processor of the computing device. The method includes determining that the firmware update image and an image of firmware with code of the secure boot process were digitally signed by a same entity and overriding the secure boot process to allow execution of the firmware update image in response to determining that the firmware update image and the image of the firmware with the code of the secure boot process were digitally signed by a same entity.

Another method for allowing a firmware update when a digital certificate for a firmware update image is expired includes initiating a firmware update of a computing device and determining, using a secure boot process, that a firmware update image has an expired digital certificate. The firmware update image is stored in nonvolatile memory accessible to a service processor and to a host processor of the computing device. The method includes accessing a temporary digital certificate of the firmware update image provided by the service processor and overriding the secure boot process to allow execution of the firmware update image in response to the secure boot process accessing and accepting the temporary digital certificate.

An apparatus for allowing a firmware update when a digital certificate for a firmware update image is expired includes a boot utility of a computing device with an update module configured to initiate a firmware update of the computing device and a validity module configured to determine, using a secure boot process, validity of a digital certificate of a firmware update image. The firmware update image is stored in nonvolatile memory accessible to a service processor and to a host processor of the computing device. The nonvolatile memory storing the firmware update image is different than nonvolatile memory storing an image of the boot utility. The boot utility includes an equivalence module configured to, in response to determining that the digital certificate of the firmware update image is expired, determine whether the firmware update image and an image of firmware with code of the secure boot process were digitally signed by a same entity, and an override module configured to override the secure boot process to allow execution of the firmware update image in response to the equivalence module determining that the firmware update image and the image of the firmware with code of the secure boot process were digitally signed by a same entity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
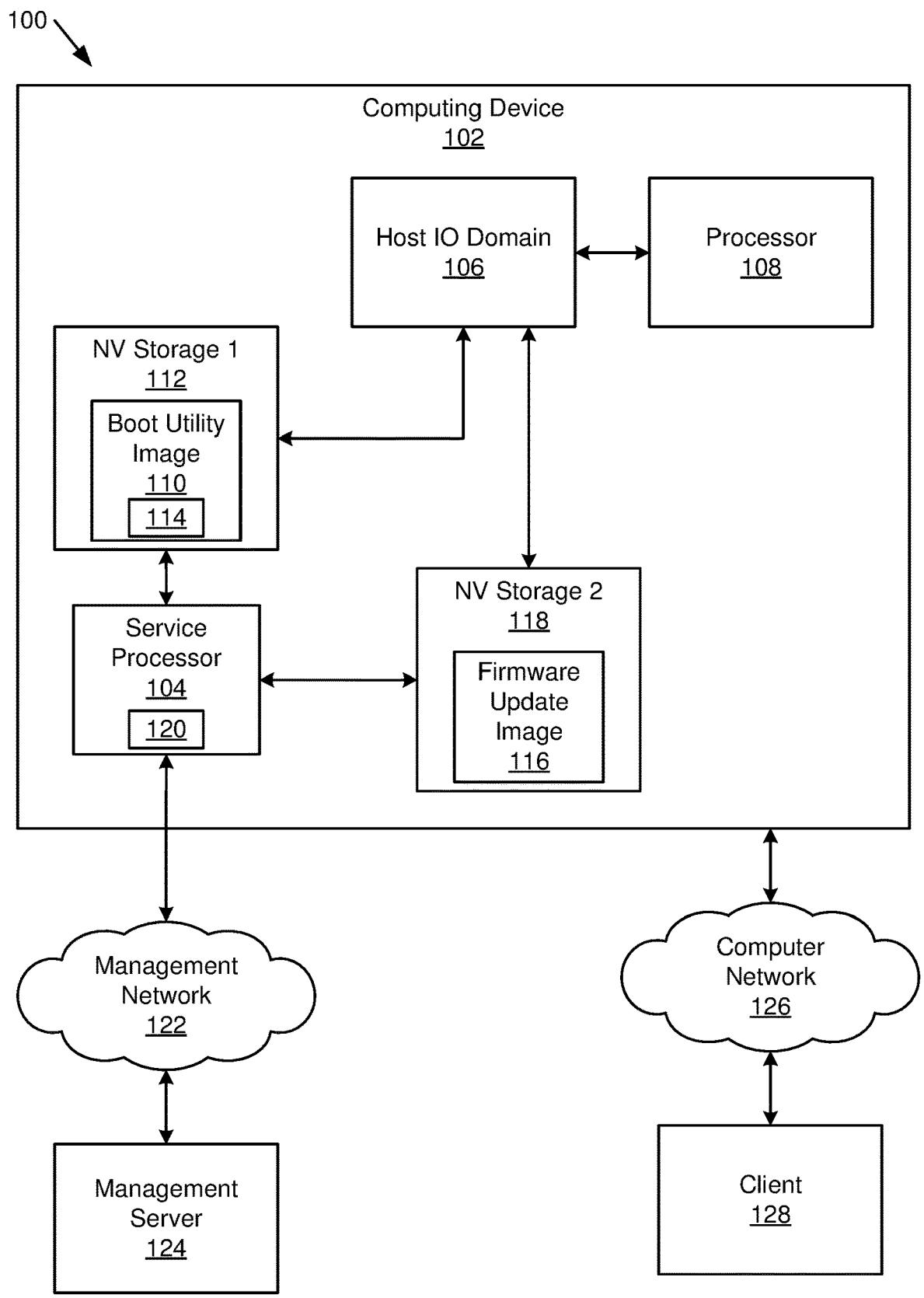
FIG. 1 is a schematic block diagram illustrating a system for allowing a firmware update when a digital certificate for a firmware update image is expired, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The computer readable storage devices, in some embodiments, are tangible, non-transitory, and/or non-transmission. In embodiments described herein, computer readable storage media may be referred to as a nonvolatile storage device, nonvolatile storage, data storage, and the like, which are all tangible, non-transitory and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for allowing a firmware update when a digital certificate for a firmware update image is expired is disclosed. The method includes initiating a firmware update of a computing device and determining, using a secure boot process, that a firmware update image has an expired digital certificate. The firmware update image is stored in nonvolatile memory accessible to a service processor and to a host processor of the computing device. The method includes determining that the firmware update image and an image of firmware with code of the secure boot process were digitally signed by a same entity and overriding the secure boot process to allow execution of the firmware update image in response to determining that the firmware update image and the image of the firmware with the code of the secure boot process were digitally signed by a same entity.

In some embodiments, the method includes updating the digital certificate of the firmware update image prior to the firmware update image updating firmware of the computing device. In other embodiments, updating the digital certificate of the firmware update image prior to the firmware update image updating the firmware of the computing device includes rebooting execution of the firmware update image in response to updating the digital certificate of the firmware update image before updating the firmware of the computing device. In other embodiments, determining that the firmware update image and an image of firmware with code of the secure boot process were digitally signed by a same entity includes determining that the image of the firmware with the code of the secure boot process is in a secure nonvolatile memory limited to modification through the service processor by the entity that signed the digital certificate of the firmware update image.

In some embodiments, overriding the secure boot process to allow execution of the firmware update image is further in response to the service processor obtaining a valid temporary digital certificate to replace the certificate of the firmware update image and the secure boot process accepting the temporary digital certificate. In other embodiments, the service processor requests and receives the temporary digital certificate from the entity that digitally signed the digital certificate of the firmware update image in response to the secure boot process determining that the digital certificate of the firmware update image is expired. In other embodiments, the service processor obtaining a valid temporary digital certificate to replace the certificate of the firmware update image and the secure boot process accepting the temporary digital certificate further includes the secure boot process accessing the temporary digital certificate through the service processor or the service processor overwriting the digital certificate of the firmware update image with the temporary digital certificate.

In some embodiments, the firmware with the code of the secure boot process is a boot utility used to boot the computing device. In other embodiments, the boot utility is a Unified Extensible Firmware Interface ("UEFI"). In other embodiments, the firmware with the code of the secure boot process is stored in a nonvolatile memory chip different than the nonvolatile memory storing the firmware update image.

Another method for allowing a firmware update when a digital certificate for a firmware update image is expired includes initiating a firmware update of a computing device and determining, using a secure boot process, that a firmware update image has an expired digital certificate. The firmware update image is stored in nonvolatile memory accessible to a service processor and to a host processor of the computing device. The method includes accessing a temporary digital certificate of the firmware update image provided by the service processor and overriding the secure boot process to allow execution of the firmware update image in response to the secure boot process accessing and accepting the temporary digital certificate.

In some embodiments, overriding the secure boot process to allow execution of the firmware update image is in further response to determining that the firmware update image and an image of firmware with code of the secure boot process were digitally signed by a same entity. In other embodiments, the method includes updating the digital certificate of the firmware update image prior to the firmware update image updating firmware of the computing device. In other embodiments, determining that the firmware update image and an image of firmware with code of the secure boot process were digitally signed by a same entity includes determining that the image of the firmware with code of the secure boot process is in a secure nonvolatile memory limited to modification through the service processor by the entity that signed the digital certificate of the firmware update image.

An apparatus for allowing a firmware update when a digital certificate for a firmware update image is expired includes a boot utility of a computing device with an update module configured to initiate a firmware update of the computing device and a validity module configured to determine, using a secure boot process, validity of a digital certificate of a firmware update image. The firmware update image is stored in nonvolatile memory accessible to a service processor and to a host processor of the computing device. The nonvolatile memory storing the firmware update image is different than nonvolatile memory storing an image of the boot utility. The boot utility includes an equivalence module configured to, in response to determining that the digital certificate of the firmware update image is expired, determine whether the firmware update image and an image of firmware with code of the secure boot process were digitally signed by a same entity, and an override module configured to override the secure boot process to allow execution of the firmware update image in response to the equivalence module determining that the firmware update image and the image of the firmware with code of the secure boot process were digitally signed by a same entity.

In some embodiments, the apparatus includes a certificate update module configured to update the digital certificate of the firmware update image prior to the firmware update image updating firmware of the computing device. In other embodiments, the certificate update module updating the digital certificate of the firmware update image prior to the firmware update image updating firmware of the computing device includes a reboot module configured to direct the boot utility to reboot the execution of firmware update image in response to updating the digital certificate of the firmware update image before updating the firmware of the computing device.

In some embodiments, the override module overriding the secure boot process to allow execution of the firmware update image is further in response to a temporary certificate module obtaining a valid temporary digital certificate to replace the certificate of the firmware update image and the secure boot process accepting the temporary digital certificate. In other embodiments, the temporary certificate module is further configured to request and receive the temporary digital certificate from the entity that digitally signed the digital certificate of the firmware update image in response to the secure boot process determining that the digital certificate of the firmware update image is expired. In other embodiments, the temporary certificate module obtaining a valid temporary digital certificate to replace the certificate of the firmware update image and the secure boot process accepting the temporary digital certificate further includes the secure boot process accessing the temporary digital certificate from the temporary certificate module or the temporary certificate module overwriting the digital certificate of the firmware update image with the temporary digital certificate.

FIG. 1 is a schematic block diagram illustrating a system 100 for allowing a firmware update when a digital certificate for a firmware update image is expired, according to various embodiments. The system 100 includes a computing device 102, a service processor 104, a host input/output ("IO") domain 106, a processor 108, a boot utility image 110, a first nonvolatile ("NV") storage device 112, a secure boot bypass apparatus 114, a firmware update image 116, a second nonvolatile storage device 118, a temporary certificate apparatus 120, a management network 122, a management server 124, a computer network 126, and a client 128, which are described below.

The system 100 includes a computing device 102 with a service processor 104, and a host IO domain 106 that at least functions as an interface between at least one processor 108 and the service processor 104. The host IO domain hardware 106 includes the IO domain for the computing device 102. The host IO domain hardware 106 may include bussing and a chipset and may also include other hardware. For example, the host IO domain hardware 106 include a north bridge and a south bridge. The host IO domain hardware 106 includes a connection suitable for connecting to the first and second nonvolatile ("NV") storage devices 112, 118. In some embodiments, the processor 108 includes the functions of the host IO domain hardware 106.

The service processor 104 provides access to the computing device 102 for control, monitoring, and other management functions. In some embodiments, the service processor 104 is referred to as a Baseboard Management Controller ("BMC"). In some embodiments, the service processor is an XClarity® Controller ("XCC") by Lenovo®. In other embodiments, the service processor 104 is from another vendor.

One management function provided through the service processor 104 is a firmware update for a boot utility image 110 stored on a first nonvolatile storage device 112. The boot utility image 110 of a boot utility may also include a secure boot bypass apparatus 114, which is discussed below. The boot utility typically carries out initial steps in starting up the computing device 102 to load drivers, an operating system, etc., to initiate execution of code, to load user preferences, and the like during startup (e.g., booting) of the computing device 102.

In some embodiments, the boot utility is a Unified Extensible Firmware Interface ("UEFI"), which is used to boot the computing device 102 and is a more advanced version of a Basic Input/Output System ("BIOS"). In other embodiments, the boot utility is another application, such as a next generation boot utility replacing UEFI. The embodiments described herein are applicable to various versions of a boot utility.

Typically, the boot utility is stored as a boot utility image 110 and is implemented using code stored on nonvolatile memory, such as an electrically erasable programmable read-only memory ("EEPROM"), an erasable programmable read-only memory ("EPROM"), a non-volatile random-access memory ("NVRAM"), flash memory, or other type of nonvolatile memory that is suitable for a firmware image. The first and second NV storage devices 112, 118 each have a connection to the service processor 104, which allows control, updating, etc., and connections to the host IO domain 106 and processor 108 for execution.

In some embodiments, as depicted in FIG. 1, a firmware update utility is executed by the boot utility with a specific task of updating firmware of the computing device 102. In some embodiments, the firmware update utility is stored as a firmware update image 116 on a second nonvolatile storage device 118, which may also be an EEPROM, an EPROM, NVRAM, or the like. In some embodiments, the computing device 102 uses a secure boot process that is used to make sure software on the computing device 102 has a current digital certificate.

A digital certificate, also know as an identity certificate or a public key certificate, is a form of electronic password using the public key infrastructure ("PKI") that allows individuals and organizations to exchange data over public networks securely. A digital certificate uses cryptography and a public key to prove authenticity of firmware, software, etc. A website, organization, or individual can request a digital certificate that will then need to be validated by a publicly trusted certificate authority.

The firmware update image 116 is for a firmware update utility that, when booted, then updates firmware for the computing device 102. Typically, firmware of the computing device 102 is not updated without the firmware update utility. In some instances, the digital certificate for the firmware update image 116 is expired. This creates a unique situation because the firmware update utility needs to run to update the digital certificate of the firmware update image 116.

Disabling secure boot to perform maintenance will generally invoke protection mechanisms on the system, including making the secure boot path unbootable without re-securing it. An alternative is to consider the firmware update image boot path as a special case where secure boot logic is bypassed. This creates a security exposure for the system that is generally unacceptable to customers. A third alternative is to consider the system "locked" from further updates at the time of certificate expiration. This is impractical in today's service and support model, with security exposures being discovered throughout the lifetime of the system, making it necessary to have update support for the duration of deployment. Another alternative is to utilize an alternate boot media for purposes of instantiating a securely booted firmware update image that replaces the expired image with a refreshed one. This process is cumbersome, particularly at larger scale.

The secure boot bypass apparatus 114 first determines, using a secure boot process, whether the firmware update image has an expired digital certificate after initiation of a firmware update of for the computing device 102. If the digital certificate for the firmware update image is expired, the secure boot bypass apparatus 114 determines if the firmware update image and an image of firmware with code of the secure boot process were digitally signed by a same entity. If the secure boot bypass apparatus 114 determines that the firmware update image and the image of the firmware with the code of the secure boot process were digitally signed by the same entity, the secure boot bypass apparatus 114 overrides the secure boot process to allow execution of the firmware update image.

After the firmware update utility has been booted from the firmware update image, in some embodiments, the firmware update utility updates the digital certificate of the firmware update utility and the firmware update utility is then available to update firmware of the computing device 102. In other embodiments, the secure boot bypass apparatus 114 uses a temporary digital certificate for the firmware update image to override the secure boot process and allow the firmware update image to be executed.

The service processor 104 includes, in some embodiments, a temporary certificate apparatus 120 that requests and receives a temporary digital certificate for the firmware update image in response to the validity module 204 determining that the digital certificate is expired. In some embodiments, the temporary certificate apparatus 120 intercepts communication from the validity module 204 and makes available the temporary digital certificate. Thus, the secure boot bypass apparatus 114 and the temporary certificate apparatus 120 provide a secure way to allow execution of the firmware update image 116 with an expired digital certificate. The secure boot bypass apparatus 114 and the temporary certificate apparatus 120 are described in more detail below with regard to the apparatuses 200, 300 of FIGS. 2 and 3.

The system 100 includes a management network 122 connected to a management server 124. The management network 122 is typically a private network. In some embodiments, the management network 122 operates over a public network using a security protocol to remain private. The computer network 126 may be private or public. The computer network 126 and/or management network 122 may include LAN, a WAN, may include the Internet, may include a fiber network, etc. and may be made up of multiple networks and/or network types. In some embodiments, the computer network 126 and/or management network 122 include a wireless connection.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The management server 124 controls the service processor 104 and typically provides firmware images for updates, digital certificates, software updates, and the like to the service processor 104, which then either provides images, digital certificates, etc. to the boot utility, to the firmware update utility, etc. or the service processor 104 performs updates. Typically, the management server 124 is owned or controlled by the entity that digitally signed the firmware update image 116, the boot utility image 110, manufactured the computing device 102, etc. The management server 124 sends management requests and instructions over the management network 122 and the service processor 104 responds to the management server 124 over the management network 122. Other data operations in response to workload requests and other requests from clients 128 are typically over the computer network 126.

Figure 2:
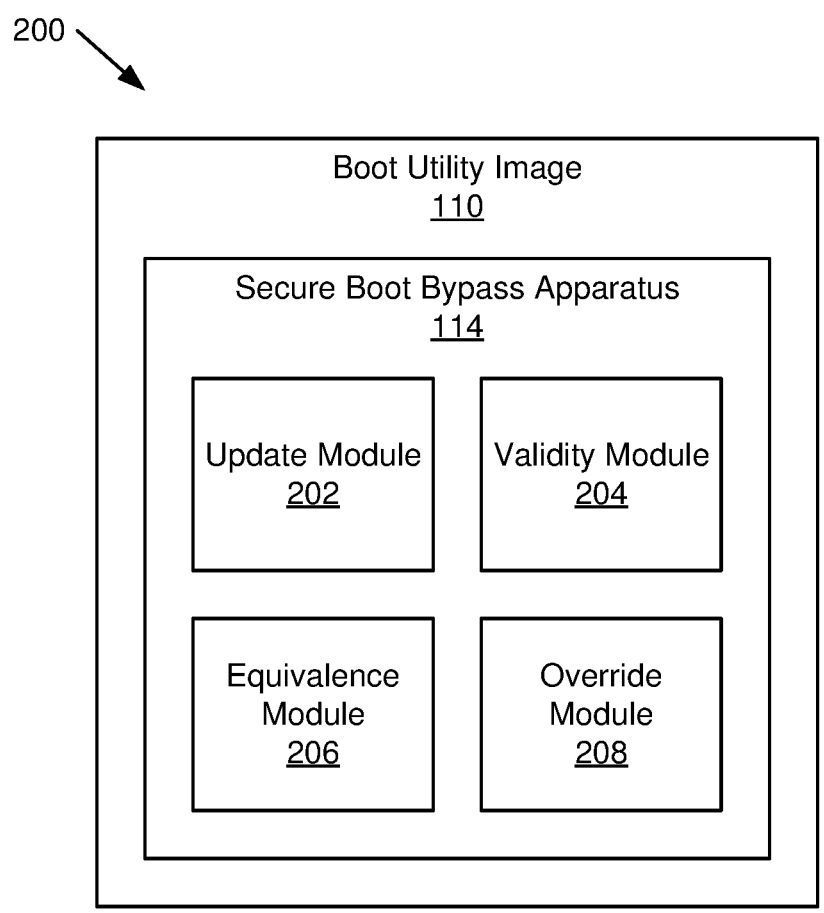
FIG. 2 is a schematic block diagram illustrating an apparatus for allowing a firmware update when a digital certificate for a firmware update image is expired, according to various embodiments.

FIG. 2 is a schematic block diagram illustrating an apparatus 200 for allowing a firmware update when a digital certificate for a firmware update image is expired, according to various embodiments. The apparatus 200 includes a secure boot bypass apparatus 114 in a boot utility image 110 and the secure boot bypass apparatus 114 incudes an update module 202, a validity module 204, an equivalence module 206, and an override module 208, which are described below. In some embodiments, the secure boot bypass apparatus 114 is implemented as code stored in a nonvolatile storage device (e.g., first nonvolatile storage device 112). In other embodiments, all or a portion of the apparatus 200 is implemented in another way, such as using hardware circuits or a programmable hardware device.

The apparatus 200 includes an update module 202 configured to initiate a firmware update of the computing device 102. In some embodiments, the update module 202 responds to an update request, such as from the management server 124 and/or the service processor 104. In other embodiments, the update module 202 detects a firmware update and initiates the firmware update. A firmware update, as used herein, includes providing an update of existing firmware to be stored in nonvolatile memory (e.g., 112, 118 or other device) either in place of existing firmware or stored elsewhere when the existing firmware is erased, disabled, etc. In the embodiments described herein, the firmware update utility executing from the firmware update image 116 is used to update the firmware.

The apparatus 200 includes a validity module 204 configured to determine validity of a digital certificate of the firmware update image 116. The firmware update image 116 stored in nonvolatile memory of the second nonvolatile storage device 118 accessible to the service processor 104 and to a host processor 108 of the computing device 102. The nonvolatile memory stores the firmware update image 116 different than nonvolatile memory (e.g., the first nonvolatile storage device 112) storing an image of the boot utility (e.g., boot utility image 110). In some embodiments, the first nonvolatile storage device 112 and the second nonvolatile storage device 118 are physically separate devices. In other embodiments, the first and second nonvolatile storage devices 112, 118 are in a same nonvolatile storage device, but are separated by a partition or other memory division allowing the boot utility image 110 to be accessed separately from the firmware update image 116.

Typically, the validity module 204 determines validity of a digital certificate of the firmware update image 116 by checking an expiration date of the digital image. As part of a secure boot process, software and firmware images typically include an expiration date so that the secure boot process can require updates of digital certificates, which provides added security in that software and firmware need to be periodically revalidated. In some embodiments, firmware for the secure boot process is part of the boot utility image 110. In other embodiments, firmware for the secure boot process is separate from the boot utility image 110. In some embodiments, the firmware for the secure boot process is stored separately from the image of the firmware update image 116. The validity module 204 determines that the digital certificate of the firmware update image 116 is expired by determining that an expiration date of the digital certificate is older than a current date.

In some embodiments, the digital certificate of the firmware update image 116 is stored with the firmware update image 116. In other embodiments, the digital certificate of the firmware update image 116 is stored in a digital certificate repository accessible to the validity module 204 and secure boot process. In some embodiments, the validity module 204 is part of the secure boot process. In other embodiments, the secure boot process operates as part of the boot utility. In other embodiments, the validity module 204 accesses results of the secure boot process or otherwise communicates with the secure boot process where the secure boot process determines that the digital certificate of the firmware update image 116 has expired. In some embodiments, the validity module 204, and/or the secure boot process are triggered to check the validity of the digital certificate of the firmware update image 116 in response to the update module 204 initiating or otherwise signaling initiation of a firmware update. One of skill in the art will recognize other ways for the validity module 204 to determine the validity of the digital certificate of the firmware update image 116.

The apparatus 200 includes an equivalence module 206 configured to, in response to the validity module 204 determining that the digital certificate of the firmware update image 116 is expired, determine whether the firmware update image 116 and an image of firmware that includes code of the secure boot process (e.g., the boot utility image 110) were digitally signed by a same entity. Typically, when the computing device 102 is manufactured and/or commissioned, an entity, such as the manufacturer of the computing device 102, installs firmware in the computing device 102. The installed firmware typically includes the boot utility image 110, which may include firmware for the secure boot process, and the firmware update image 116. The entity also typically digitally signs the installed firmware.

In some embodiments, after determining validity of the digital certificate of the boot utility image 110 and/or firmware for the secure boot process is stripped from the firmware and validity of a digital signature is presumed based on the location of the boot utility image 110 and/or firmware of the secure boot process, which is a secure location limited to modification through the service processor 104 by the entity that signed the digital certificate of the firmware update image. Typically, the first nonvolatile storage device 112 is secure by only being accessible for writing or updating by the service processor 104, which is a controlled, secure process through the management server 124 over a private management network 122.

In some embodiments, the boot utility image 110 and/or firmware of the secure boot process include an indication of the entity that digitally signed the firmware. For example, where the entity is Lenovo®, Lenovo may then have installed the firmware and digitally signed the firmware and the equivalence module 206 is able to determine that Lenovo digitally signed the firmware. In some embodiments, the boot utility image 110 and/or firmware of the secure boot process include a token, a code, a tag, or other stored information that indicates an identity of the entity that digitally signed the boot utility image 110 and/or firmware of the secure boot process.

The equivalence module 206, in some embodiments, determines the entity that digitally signed the firmware update image 116 from the digital certificate of the firmware update image 116. In other embodiments, the equivalence module 206 determines the entity that digitally signed the firmware update image 116 from a token, a code, a tag, or other stored information that indicates an identity of the entity that digitally signed the firmware update image 116.

The apparatus 200 includes an override module 208 configured to override the secure boot process to allow execution of the firmware update image 116 in response to the equivalence module 206 determining that the firmware update image 116 and the image of the firmware with code of the secure boot process were digitally signed by a same entity. In some embodiments, the override module 208 provides a temporary override of the secure boot process just long enough to execute the firmware update image 116. After execution of the firmware update image 116 following this temporary override, the secure boot process, in some embodiments, is activated for subsequent updating of the digital certificate of the firmware update image 116. In some embodiments, the override module 208 only overrides a requirement of a valid digital certificate of the firmware update image 116 while still requiring a valid digital certificate for other software and firmware.

In some embodiments, the processor 108 executes the firmware update image 116. Execution of the firmware update image 116 initiates the firmware update utility, which then updates firmware as necessary. Once the firmware update utility is booted, in some embodiments, the digital certificate for the firmware update image 116 is allowed to be updated.

Figure 3:
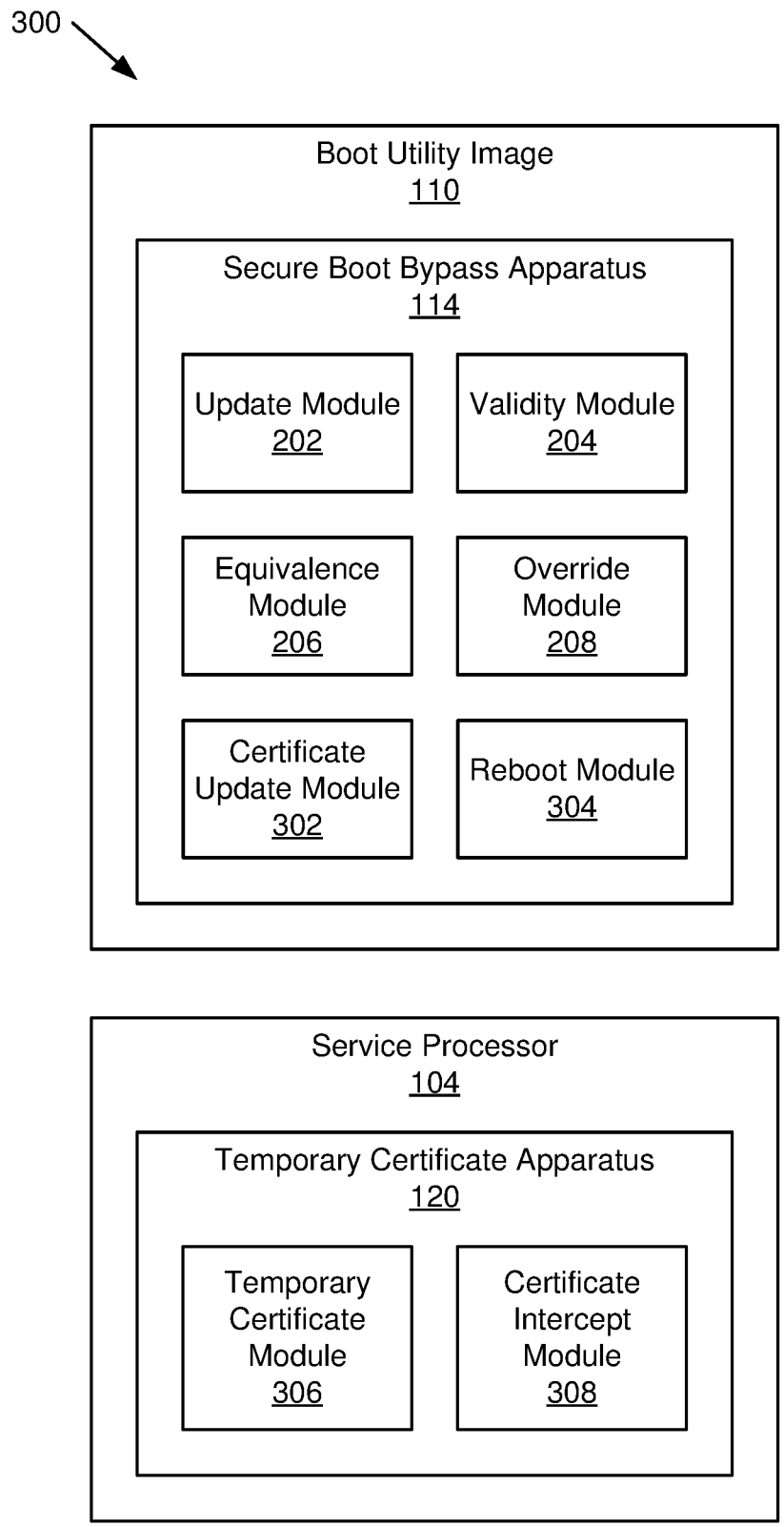
FIG. 3 is a schematic block diagram illustrating another apparatus for allowing a firmware update when a digital certificate for a firmware update image is expired, according to various embodiments.

FIG. 3 is a schematic block diagram illustrating another apparatus 300 for allowing a firmware update when a digital certificate for a firmware update image is expired, according to various embodiments. The apparatus 300 includes a secure boot bypass apparatus 114 in the boot utility image 110 and a temporary certificate apparatus 120 in the service processor 104. The secure boot bypass apparatus 114 includes an update module 202, a validity module 204, an equivalence module 206, and an override module 208, which are substantially similar to those described above in relation to the apparatus 200 of FIG. 2. The apparatus 300 also includes a certificate update module 302 and a reboot module 304 and the temporary certificate apparatus 120 includes a temporary certificate module 306 and/or a certificate intercept module 308, which are described below. The apparatus 300 may be implemented in a similar manner as the apparatus 200 of FIG. 2. In addition, all or a portion of the modules 202, 204, 206, 208, 302, 304, 306 may be located elsewhere.

The apparatus 300 includes a certificate update module 302 configured to update the digital certificate of the firmware update image 116 prior to the firmware update image 116 updating firmware of the computing device 102. After the override module 208 allows execution of the firmware update image 116, in some embodiments, the certificate update module 302 updates the digital certificate of the firmware update image 116, for example through the secure boot process of the boot utility. In some embodiments, the certificate update module 302 communicates through the service processor 104 to the management server 124 to certify the firmware update image 116 and get a digital certificate. The firmware update image 116 will then be compliant and may be executed for firmware updates without using the equivalence module 206 and the override module 208.

In some embodiments, the apparatus 300 includes a reboot module 304 configured to direct the boot utility to reboot execution of firmware update image 116 in response to the certificate update module 302 updating the digital certificate of the firmware update image 116 before updating the firmware of the computing device 102. In some embodiments, rebooting the firmware update image 116 includes first allowing the secure boot process to verify validity of the firmware update image 116 and/or to check validity of a new digital certificate before reloading the firmware update image 116 in memory and executing the firmware update image 116. In some embodiments, rebooting of the firmware update utility completes an update process.

In some embodiments, the apparatus 300 includes a temporary certificate module 306 in the service processor 104 configured to request and receive a temporary digital certificate from the entity that digitally signed the digital certificate of the firmware update image 116 in response to the secure boot process and/or validity module 204 determining that the digital certificate of the firmware update image 116 is expired. In other embodiments, the temporary certificate module 306 is triggered by another event, such as expiration of the digital certificate of the firmware update image 116, checking the digital certificate of the firmware update image 116 by another process, etc.

In some embodiments, the override module 208 overrides the secure boot process to allow execution of the firmware update image 116 in response to the temporary certificate module 306 obtaining a valid temporary digital certificate to replace the certificate of the firmware update image 116 and the secure boot process accepting the temporary digital certificate. In some embodiments, the override module 208 overrides the secure boot process and allows execution of the firmware update image 116 in response to both the equivalence module 206 determining that the firmware update image 116 and the image of the firmware with code of the secure boot process were digitally signed by a same entity and the secure boot process accepting the temporary digital certificate. In other embodiments, the override module 208 overrides the secure boot process and allows execution of the firmware update image 116 in response to just the secure boot process accepting the temporary digital certificate.

In some embodiments, the temporary certificate module 306 is further configured to overwrite the expired digital certificate of the firmware update image 116 with the temporary digital certificate. The secure boot process then accepts the temporary digital certificate, at least on a temporary basis. In other embodiments, the apparatus 300 includes a certificate intercept module 308 configured to intercept notification by the validity module 204 that the digital certificate of the firmware update image 116 is expired, which triggers the temporary certificate module 306 to request and receive the temporary digital certificate, and the certificate intercept module 308 makes the temporary digital certificate available at the service processor 104. The override module 208 and/or secure boot process accesses the temporary digital certificate at the service processor 104.

Figure 4:
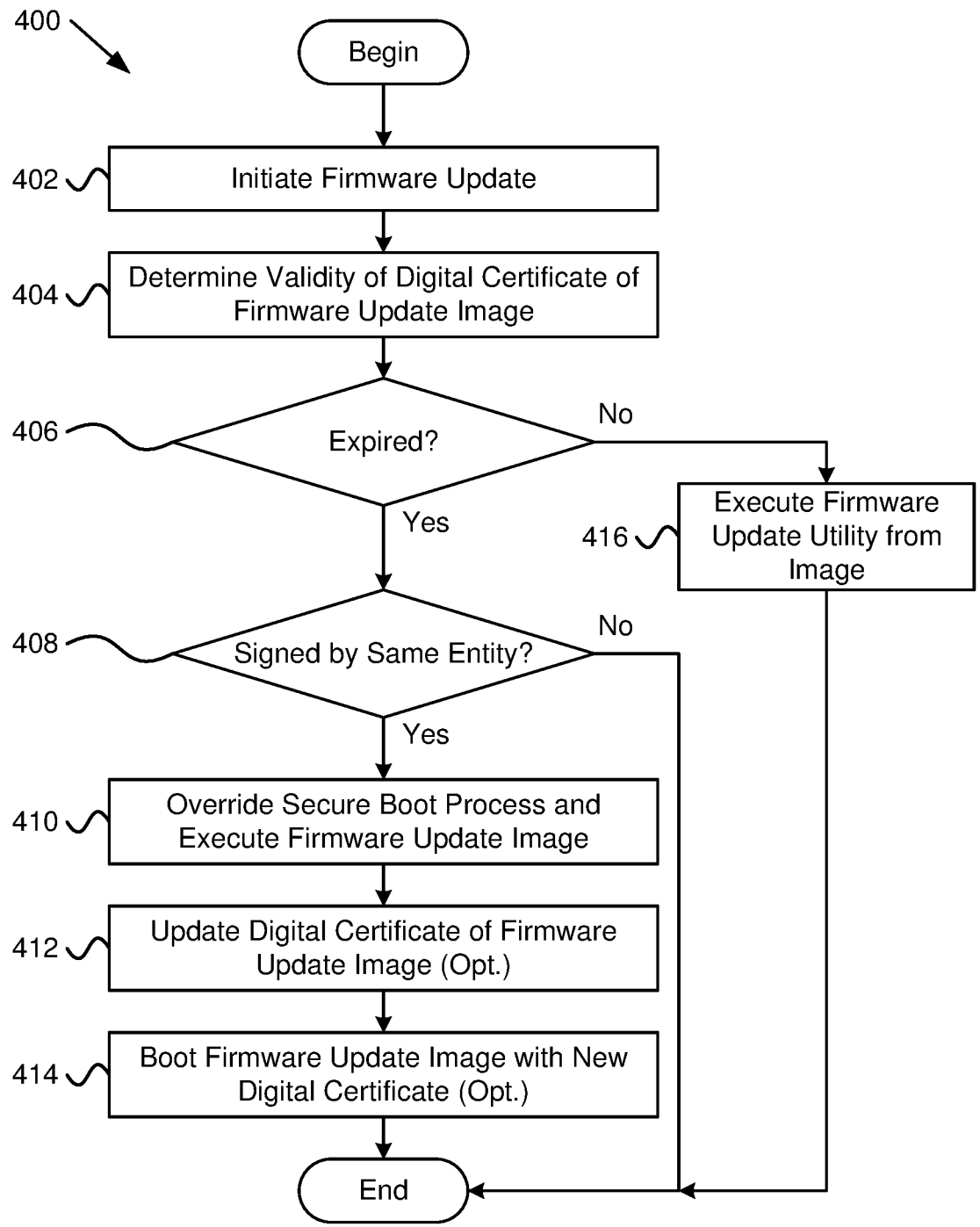
FIG. 4 is a schematic flow chart diagram illustrating a method for allowing a firmware update when a digital certificate for a firmware update image is expired, according to various embodiments.

FIG. 4 is a schematic flow chart diagram illustrating a method 400 for allowing a firmware update when a digital certificate for a firmware update image is expired, according to various embodiments. The method 400 begins and initiates 402 a firmware update process of a computing device 102 and determines 404, using a secure boot process, validity of a digital certificate of a firmware update image 116. The firmware update image 116 is stored in nonvolatile memory, such as the second nonvolatile storage device 118, accessible to a service processor 104 and to a host processor 108 of the computing device 102.

If the method 400 determines 406 that the digital certificate has expired, the method 400 determines 408 if the firmware update image 116 and an image (e.g., 110) of firmware that includes code of the secure boot process were digitally signed by a same entity. If the method 400 determines 408 that the firmware update image 116 and an image of the firmware that includes code of the secure boot process were digitally signed by a same entity, the method 400 overrides 410 the secure boot process to allow execution of the firmware update image 116, and in some embodiments, the method 400 ends. In other embodiments, the method 400 optionally updates 412 the digital certificate of the firmware update image 116 and/or reboots 414 execution of the firmware update image 116 before updating the firmware of the computing device 102, and the method 400 ends.

If the method 400 determines 406 that the digital certificate of the firmware update image 116 is valid, the method 400 executes 416 the firmware update image 116, and the method 400 ends. If the method 400 determines 408 that the firmware update image 116 and the firmware that includes code of the secure boot process were not signed by the same entity, the method 400 ends. The firmware update image 116 and the firmware that includes code of the secure boot process not being signed by the same entity indicates a problem, such as a malicious attack resulting in non-authentic firmware being substituted. In various embodiments, all or a portion of the method 400 is implemented using the update module 202, the validity module 204, the equivalence module 206, the override module 208, the certificate update module 302, and/or the reboot module 304.

Figure 5:
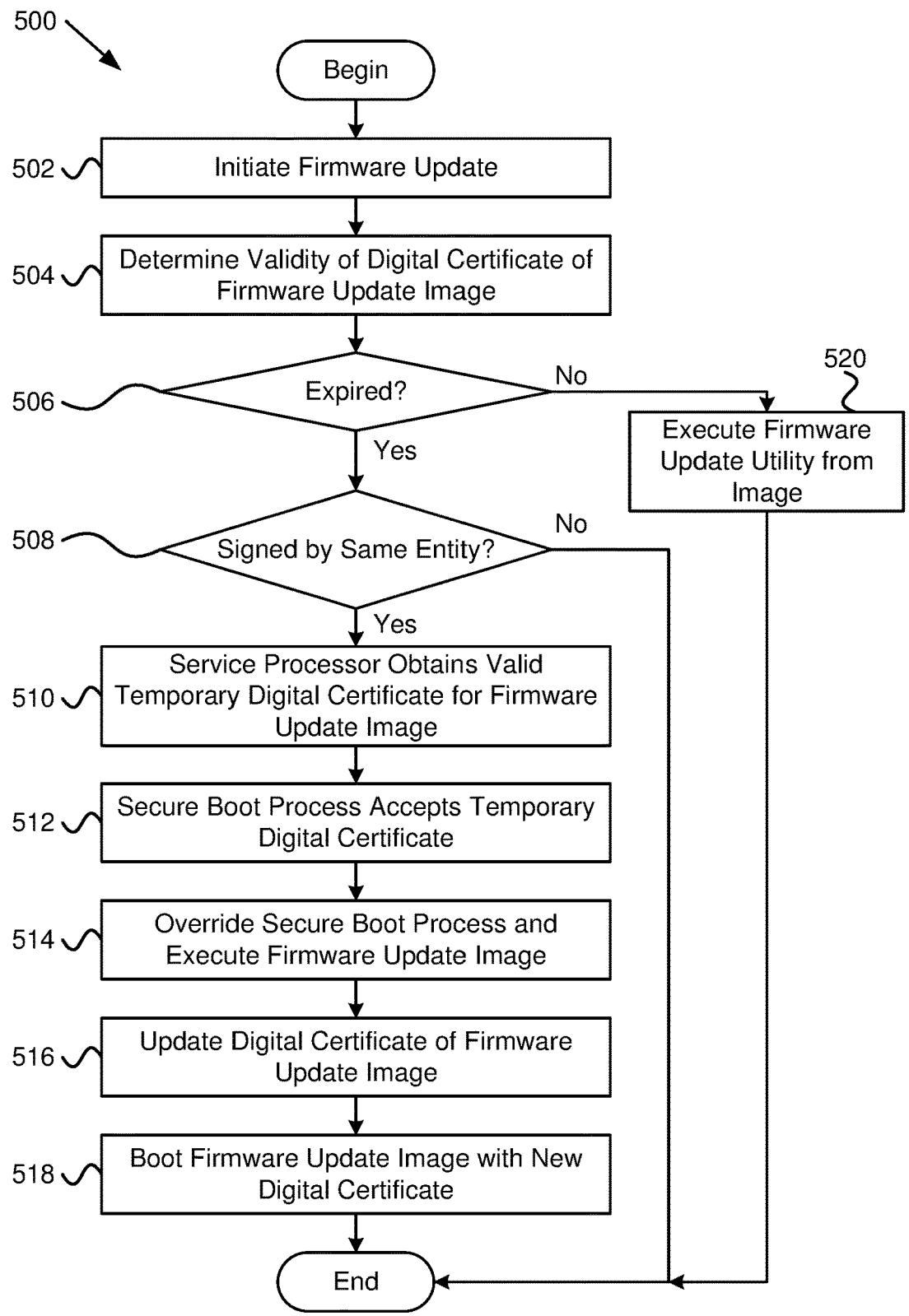
FIG. 5 is a schematic flow chart diagram illustrating another method for allowing a firmware update when a digital certificate for a firmware update image is expired, according to various embodiments.

FIG. 5 is a schematic flow chart diagram illustrating another method 500 for allowing a firmware update when a digital certificate for a firmware update image is expired, according to various embodiments. The method 500 begins and initiates 502 a firmware update process of a computing device 102 and determines 504, using a secure boot process, validity of a digital certificate of a firmware update image 116. The firmware update image 116 is stored in nonvolatile memory, such as the second nonvolatile storage device 118, accessible to a service processor 104 and to a host processor 108 of the computing device 102.

If the method 500 determines 506 that the digital certificate has expired, the method 500 determines 508 if the firmware update image 116 and an image (e.g., 110) of firmware that includes code of the secure boot process were digitally signed by a same entity. If the method 500 determines 508 that the firmware update image 116 and an image of the firmware that includes code of the secure boot process were digitally signed by the same entity, the method 500, through the service processor 104, obtains 510 a valid temporary digital certificate for the firmware update image 116 and accepts 512, through the secure boot process, the temporary digital certificate.

The method 500 overrides 514 the secure boot process to allow execution of the firmware update image 116 in response to the secure boot process accessing and accepting the temporary digital certificate, and in some embodiments, the method 500 ends. In other embodiments, the method 500 optionally updates 516 the digital certificate of the firmware update image 116 and/or reboots 518 execution of the firmware update image 116 before updating the firmware of the computing device 102, and the method 500 ends.

If the method 500 determines 506 that the digital certificate of the firmware update image 116 is valid, the method 500 executes 520 the firmware update image 116, and the method 500 ends. If the method 500 determines 508 that the firmware update image 116 and the firmware that includes code of the secure boot process were not signed by the same entity, the method 500 ends. In various embodiments, all or a portion of the method 500 is implemented using the update module 202, the validity module 204, the override module 208, the certificate update module 302, the reboot module 304, the temporary certificate module 306, and/or the certificate intercept module 308.

Figure 6:
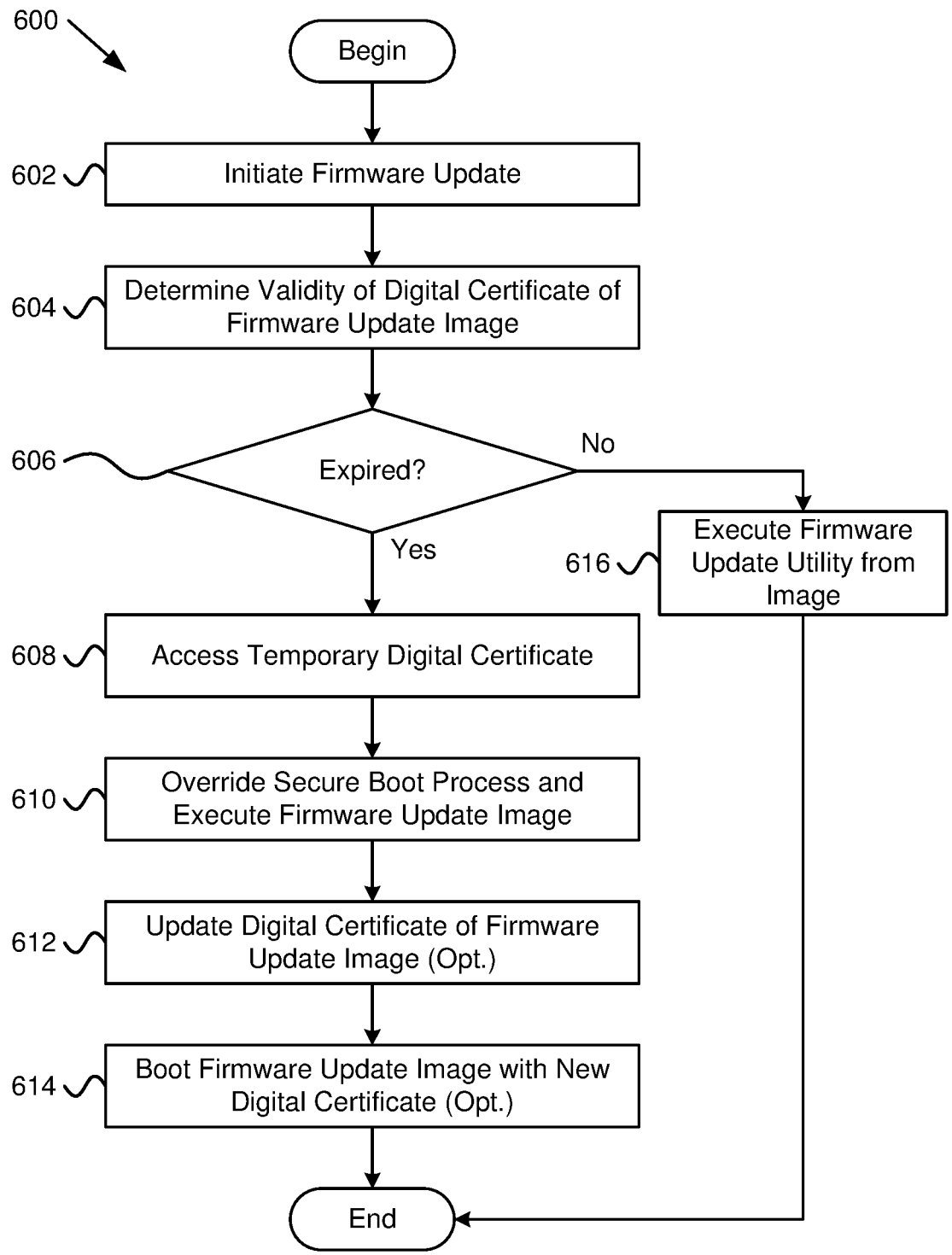
FIG. 6 is a schematic flow chart diagram illustrating a third method for allowing a firmware update when a digital certificate for a firmware update image is expired, according to various embodiments.

FIG. 6 is a schematic flow chart diagram illustrating a third method 600 for allowing a firmware update when a digital certificate for a firmware update image is expired, according to various embodiments. The method 600 begins and initiates 602 a firmware update process of a computing device 102 and determines 604, using a secure boot process, validity of a digital certificate of a firmware update image 116. The firmware update image 116 is stored in nonvolatile memory, such as the second nonvolatile storage device 118, accessible to a service processor 104 and to a host processor 108 of the computing device 102.

If the method 600 determines 606 that the digital certificate has expired, the method 600 accesses 608 a temporary digital certificate for the firmware update image 116 and overrides 610 the secure boot process to execute the firmware update image 116, and in some embodiments, the method 600 ends. In other embodiments, the method 600 optionally updates 612 the digital certificate of the firmware update image 116 and/or reboots 614 execution of the firmware update image 116 before updating the firmware of the computing device 102, and the method 600 ends.

If the method 600 determines 606 that the digital certificate of the firmware update image 116 is valid, the method 500 executes 616 the firmware update image 116, and the method 600 ends. In various embodiments, all or a portion of the method 600 is implemented using the update module 202, the validity module 204, the override module 208, the certificate update module 302, the reboot module 304, the temporary certificate module 306, and/or the certificate intercept module 308.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   initiating a firmware update of a computing device;
   determining, using a secure boot process, that a firmware update image has an expired digital certificate, the firmware update image stored in nonvolatile memory accessible to a service processor and to a host processor of the computing device;
   determining that the firmware update image and an image of firmware comprising code of the secure boot process were digitally signed by a same entity; and
   overriding the secure boot process to allow execution of the firmware update image in response to determining that the firmware update image and the image of the firmware comprising the code of the secure boot process were digitally signed by a same entity.

2. The method of claim 1, further comprising updating the digital certificate of the firmware update image prior to the firmware update image updating firmware of the computing device.

3. The method of claim 2, wherein updating the digital certificate of the firmware update image prior to the firmware update image updating the firmware of the computing device comprises rebooting execution of the firmware update image in response to updating the digital certificate of the firmware update image before updating the firmware of the computing device.

4. The method of claim 1, wherein determining that the firmware update image and an image of firmware comprising code of the secure boot process were digitally signed by a same entity comprises determining that the image of the firmware comprising code of the secure boot process is in a secure nonvolatile memory limited to modification through the service processor by the entity that signed the digital certificate of the firmware update image.

5. The method of claim 1, wherein overriding the secure boot process to allow execution of the firmware update image is further in response to the service processor obtaining a valid temporary digital certificate to replace the certificate of the firmware update image and the secure boot process accepting the temporary digital certificate.

6. The method of claim 5, wherein the service processor requests and receives the temporary digital certificate from the entity that digitally signed the digital certificate of the firmware update image in response to the secure boot process determining that the digital certificate of the firmware update image is expired.

7. The method of claim 5, wherein the service processor obtaining a valid temporary digital certificate to replace the certificate of the firmware update image and the secure boot process accepting the temporary digital certificate further comprises one of:
the secure boot process accessing the temporary digital certificate through the service processor; and
the service processor overwriting the digital certificate of the firmware update image with the temporary digital certificate.

8. The method of claim 1, wherein the firmware comprising the code of the secure boot process comprises a boot utility used to boot the computing device.

9. The method of claim 8, wherein the boot utility is a Unified Extensible Firmware Interface ("UEFI").

10. The method of claim 1, wherein the firmware comprising the code of the secure boot process is stored in a nonvolatile memory chip different than the nonvolatile memory storing the firmware update image.

11. A method comprising:
initiating a firmware update of a computing device;
determining, using a secure boot process, that a firmware update image has an expired digital certificate, the firmware update image stored in nonvolatile memory accessible to a service processor and to a host processor of the computing device;
accessing a temporary digital certificate of the firmware update image provided by the service processor; and
overriding the secure boot process to allow execution of the firmware update image in response to the secure boot process accessing and accepting the temporary digital certificate.

12. The method of claim 11, wherein overriding the secure boot process to allow execution of the firmware update image is in further response to determining that the firmware update image and an image of firmware comprising code of the secure boot process were digitally signed by a same entity.

13. The method of claim 11, further comprising updating the digital certificate of the firmware update image prior to the firmware update image updating firmware of the computing device.

14. The method of claim 11, wherein determining that the firmware update image and an image of firmware comprising code of the secure boot process were digitally signed by a same entity comprises determining that the image of the firmware comprising code of the secure boot process is in a secure nonvolatile memory limited to modification through the service processor by the entity that signed the digital certificate of the firmware update image.

15. An apparatus comprising:
a boot utility of a computing device comprising:
an update module configured to initiate a firmware update of the computing device;
a validity module configured to determine, using a secure boot process, validity of a digital certificate of a firmware update image, the firmware update image stored in nonvolatile memory accessible to a service processor and to a host processor of the computing device, the nonvolatile memory storing the firmware update image different than nonvolatile memory storing an image of the boot utility; and
an equivalence module configured to, in response to determining that the digital certificate of the firmware update image is expired, determine whether the firmware update image and an image of firmware comprising code of the secure boot process were digitally signed by a same entity; and
an override module configured to override the secure boot process to allow execution of the firmware update image in response to the equivalence module determining that the firmware update image and the image of the firmware comprising the code of the secure boot process were digitally signed by a same entity.

16. The apparatus of claim 15, further comprising a certificate update module configured to update the digital certificate of the firmware update image prior to the firmware update image updating firmware of the computing device.

17. The apparatus of claim 16, wherein the certificate update module updating the digital certificate of the firmware update image prior to the firmware update image updating the firmware of the computing device comprises a reboot module configured to direct the boot utility to reboot the execution of firmware update image in response to updating the digital certificate of the firmware update image before updating the firmware of the computing device.

18. The apparatus of claim 15, wherein the override module overriding the secure boot process to allow execution of the firmware update image is further in response to a temporary certificate module obtaining a valid temporary digital certificate to replace the certificate of the firmware update image and the secure boot process accepting the temporary digital certificate.

19. The apparatus of claim 18, wherein the temporary certificate module is further configured to request and receive the temporary digital certificate from the entity that digitally signed the digital certificate of the firmware update image in response to the secure boot process determining that the digital certificate of the firmware update image is expired.

20. The apparatus of claim 18, wherein the temporary certificate module obtaining a valid temporary digital certificate to replace the certificate of the firmware update image and the secure boot process accepting the temporary digital certificate further comprises one of:
the secure boot process accessing the temporary digital certificate from the temporary certificate module; and
the temporary certificate module overwriting the digital certificate of the firmware update image with the temporary digital certificate.

* * * * *